United States Patent
Lee et al.

(10) Patent No.: US 9,284,194 B2
(45) Date of Patent: Mar. 15, 2016

(54) GRAPHENE OXIDE REDUCING AGENT AND METHOD FOR PREPARING REDUCED GRAPHENE OXIDE USING THE SAME

(71) Applicant: RESEARCH & BUSINESS FOUNDATION SUNGKYUNKWAN UNIVERSITY, Suwon-si (KR)

(72) Inventors: Hyoyoung Lee, Suwon-si (KR); Peng Cui, Suwon-si (KR)

(73) Assignee: RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 104 days.

(21) Appl. No.: 13/963,572

(22) Filed: Aug. 9, 2013

(65) Prior Publication Data

US 2013/0323159 A1    Dec. 5, 2013

Related U.S. Application Data

(63) Continuation of application No. PCT/KR2012/001020, filed on Feb. 10, 2012.

(30) Foreign Application Priority Data

Feb. 11, 2011 (KR) .................. 10-2011-0012306

(51) Int. Cl.
  *C01B 31/04* (2006.01)
  *B82Y 30/00* (2011.01)
  *B82Y 40/00* (2011.01)

(52) U.S. Cl.
  CPC ............. *C01B 31/0446* (2013.01); *B82Y 30/00* (2013.01); *B82Y 40/00* (2013.01); *C01B 31/0476* (2013.01)

(58) Field of Classification Search
  CPC .................. C01B 31/04463; C01B 31/0476; B82Y 40/00; B82Y 30/00
  USPC ........................................... 423/448
  See application file for complete search history.

(56) References Cited

U.S. PATENT DOCUMENTS 5,189,057 A * 2/1993 Kato et al. ............ 514/473
2013/0156678 A1 * 6/2013 Banerjee et al. ........ 423/445 R

FOREIGN PATENT DOCUMENTS

| KR | 10-2009-0059871 A | 6/2009 |
| KR | 10-2010-0078444 A | 7/2010 |
| KR | 10-2010-0105403 A | 9/2010 |
| WO | WO 2011/016889 A2 | 2/2011 |
| WO | WO 2011/159922 A2 * | 12/2011 ............ C01B 31/02 |

OTHER PUBLICATIONS

U.S. Appl. No. 61/355,290, filed Jun. 16, 2010.*
International Search report dated Aug. 27, 2012 in counterpart international application No. PCT/KR2012/001020. (2 pages in English).
Pei, S. et al., Direct reduction of graphene oxide films into highly conductive and flexible graphene films by hydrohalic acids, Carbon, vol. 48, No. 15, pp. 4466-4474, Aug. 10, 2010.
Cui, P. et al., One-pot reduction of graphene oxide at subzero temperatures, Chem. Commun., vol. 47, No. 45, pp. 12370-12372, Oct. 20, 2011.

* cited by examiner

*Primary Examiner* — Daniel C McCracken
(74) *Attorney, Agent, or Firm* — NSIP Law

(57) ABSTRACT

An agent for reducing graphene oxide and a method for preparing reduced graphene oxide or graphene are provided. An agent for reducing graphene oxide include a mixture of a reducing agent containing a halogen element with trifluoroacetic acid ($CF_3COOH$).

16 Claims, 7 Drawing Sheets

GRAPHENE OXIDE REDUCING AGENT AND METHOD FOR PREPARING REDUCED GRAPHENE OXIDE USING THE SAME

CROSS-REFERENCE TO RELATED APPLICATIONS

This application is a continuation application of International Application No. PCT/KR2012/001020 filed Feb. 10, 2012, claiming priority based on Korean Patent Application No. 10-2011-0012306 filed Feb. 11, 2011, the entire disclosure of both of which are incorporated herein by reference for all purposes.

BACKGROUND

1. Field

The following description relates to an agent for reducing graphene oxide, and a method of preparing reduced graphene oxide using the same, and to, for example, an agent for reducing graphene oxide that is a mixture of a reducing agent containing a halogen element with $CF_3COOH$, and a method of preparing reduced graphene oxide using the same.

2. Description of Related Art

Since graphene has a hexagonal structure, in which carbons are connected to one another by conjugate bonds, it exhibits high conductivity and charge mobility. Thus, graphene is a material having great future applicability. Researchers have been actively conducting researches to apply graphene that exists in the nature to various electronic and high-tech applications. A single graphene molecule has a planar sheet structure of $sp^2$-bonded carbon atoms that are densely packed in a honeycomb lattice. In order to use graphene in various applications, it is necessary to produce a large quantity of graphene comprising a single layer or multiple layers that are not a lump of graphene.

In order to prepare graphene including a single layer or multiple layers, a preparing method that involves a reduction of graphene oxide compound is often used. According to the method, graphene oxide is first obtained by using a sticky tape method or by oxidizing a lump of graphene. Thereafter, the formed graphene oxide is dispersed in a solvent, applied to a device in accordance with its purpose of use, and then reduced to exhibit graphene characteristics again.

As a method for producing graphene or reduced graphene oxide by reducing graphene oxide, there are various known methods that use reducing agents such as hydrazine hydrate, sodium borohydrate ($NaBH_4$), sulfuric acid ($H_2SO_4$), and so on. However, such graphene synthesis methods involve issues with respect to restriction in the use of a reducing agent, low efficiency, impurities included in the final product, and the like. Thus, with these methods, it is difficult to mass-produce graphene by reducing graphene oxide.

For example, until now, reduced graphene oxide obtained by using a reducing agent such as hydrazine hydrate has been known as having the highest purity. The reduced graphene oxide (RGO) obtained with hydrazine hydrate has a carbon/oxygen element ratio of 8 to 12 and contains nitrogen. The nitrogen element acts as an impurity in graphene, and it is not easy to remove the nitrogen element from graphene obtained by reducing graphene oxide using hydrazine hydrate. Due to the existence of the nitrogen element acting as an impurity, it is difficult to obtain a desired electron transfer phenomenon with the reduced graphene oxide. Thus, it is necessary to remove the nitrogen element.

Further, in case of reducing graphene oxide by using reducing agents such as hydrazine hydrate, sodium borohydrate ($NaBH_4$), sulfuric acid ($H_2SO_4$), and so on to obtain graphene, a reaction is performed at a high temperature. Thus, such a method cannot be applied to form graphene on a flexible substrate.

SUMMARY

In one general aspect, there is provided an agent for reducing graphene oxide, comprising a mixture of a reducing agent containing a halogen element with trifluoroacetic acid ($CF_3COOH$).

The reducing agent containing a halogen element may include one selected from the group consisting of HI, HCl and HBr.

The reducing agent containing a halogen element may include HI.

In another general aspect, there is provided a method of preparing reduced graphene oxide, the method comprising: reacting graphene oxide with an agent for reducing graphene oxide, in which the agent for reducing graphene oxide includes a mixture of a reducing agent containing a halogen element with trifluoroacetic acid ($CF_3COOH$).

The reacting may be performed at a temperature of $-20°$ C. or higher.

The reacting may be performed at a temperature of $-10°$ C.

The reacting may be performed in a temperature range of $-20°$ C. or higher to $120°$ C. or lower.

The reducing agent containing a halogen element may include one selected from the group consisting of HI, HCl and HBr.

The reducing agent containing a halogen element may include HI.

The graphene oxide may be in a form of powder, paper or film.

The graphene oxide may be added to a solvent including the trifluoroacetic acid, and then the reducing agent containing a halogen element may be added to the solvent to react the graphene oxide.

The general aspect of the method may further involve: performing an ultrasonic treatment before the reducing agent containing a halogen element is added.

The reducing agent containing a halogen element may include HI.

The graphene oxide in the form of paper or film may be immersed in the mixture of the reducing agent containing a halogen element with $CF_3COOH$.

The graphene oxide in the form of paper or film may be reacted with vapor gas which is evaporated from the mixture of the reducing agent containing a halogen element with $CF_3COOH$.

In another general aspect, there is provided a method of producing graphene, the method involving: reducing graphene oxide in a presence of a reducing agent including a halogen element and a solvent, the solvent including an acidic compound that is a weaker acid than the reducing agent.

The acidic compound may be trifluoroacetic acid ($CF_3COOH$).

The general aspect of the method may further involve: dispersing the graphene oxide in the solvent before reducing the graphene oxide in the presence of the reducing agent.

The reducing agent may be one selected from the group consisting of HI, HCl and HBr.

Other features and aspects may be apparent from the following detailed description, the drawings, and the claims.

Figure 1:
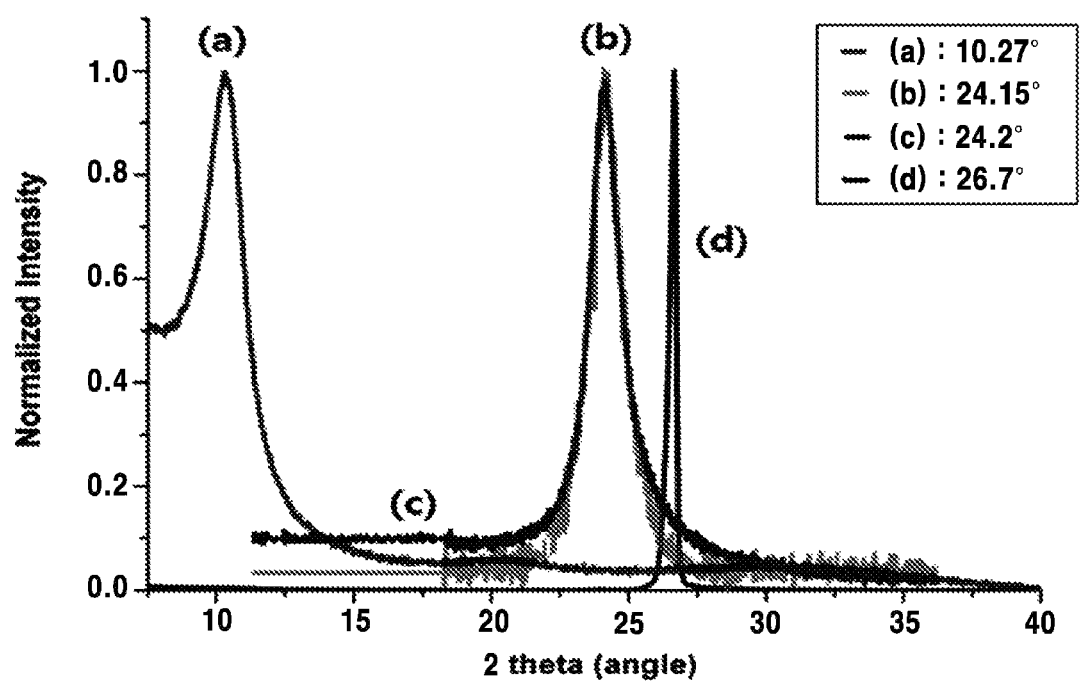
FIG. 1 is a graph showing an X-ray diffraction analysis of reduced graphene oxide ((a): graphene oxide, (b): reduced graphene oxide prepared in Example, (c): reduced graphene oxide prepared in Comparative Example 1, and (d): graphite).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Various examples of agents for reducing graphene oxide, and methods of preparing reduced graphene oxide using such an agent are described herein.

The reduced graphene oxide prepared according to the present disclosure may be applied in various fields of conductors, semiconductors, and dielectrics.

In Korean Patent Application No. 2010-0085628, the present inventors reported that, in case of using a reducing agent containing a halogen element, a content of impurities such as nitrogen, and so on is low, electrical conductivity is excellent, a low temperature process can be performed, and, thus, mass-production of reduced graphene oxide can be achieved. However, in the above-mentioned patent document, only a reducing agent that can decrease a preparing temperature of reduced graphene oxide to about 10° C. was reported and there is no description on a reducing agent for mass-production to a temperature of 10° C. or less.

In this regard, the present inventors have researched a method of preparing reduced graphene oxide by using a novel reducing agent and found that in case of using a mixture of a reducing agent containing a halogen element with $CF_3COOH$, a production temperature of reduced graphene oxide can be decreased to a temperatures of below 0° C. while good reducibility is also obtained at ambient and high temperature. As a result, the present inventors have completed the present disclosure.

Described below are various examples of agents for reducing graphene oxide that can increase a possibility of mass-production by reducing a process temperature for producing reduced graphene oxide as low as possible.

Further described below are various examples of methods of preparing or producing reduced graphene oxide having excellent electrical characteristics such as electric conductivity from graphene oxide by using the reducing agent.

Further described below are examples of a mixture of a reducing agent containing a halogen element with $CF_3COOH$ as an agent for reducing graphene oxide and examples of methods of preparing reduced graphene oxide including reacting between the agent for reducing graphene oxide and graphene oxide.

The present disclosure can provide reduced graphene oxide having low impurity content and a high purity by using an agent for reducing graphene oxide. Further, the examples of agents for reducing graphene oxide in accordance with the present disclosure may decrease production costs due to its low cost and by reducing a production temperature of the reduced graphene oxide. For example, the production temperature may be reduced to about −10° C. and the lowest to about −20° C., so that a low-temperature process can be effectively achieved.

Further, the reduced graphene oxide prepared in accordance with the present disclosure may maintain an atomic percent ratio of carbon/oxygen in the range of from about 12 to about 15 or more. Thus, it has an excellent electrical conductor feature. A degree of reduction can be adjusted depending on a reaction time. By adjusting the electrical feature of the reduced graphene oxide, the reduced graphene oxide can be applied as a conductor, a semiconductor, and the like.

For example, the reduced graphene oxide prepared in accordance with the present disclosure can be used in a doping material for a plastic solar cell and an electrode material for a super capacitor and a lithium battery. The reduced graphene oxide paper can be used for a membrane filter and gas storage. The reduced graphene oxide film prepared in accordance with the present disclosure can be applied to various fields such as a biosensor, a transparent electrode material, a hole and electron transport layer of an organic electro-luminescence device, a flexible electrode material, a memory device, a third non-linear optical device, and a counter electrode plate material, and so on.

Hereinafter, illustrative embodiments and examples of the present disclosure will be described in detail with reference to the accompanying drawings so that the present disclosure may be readily implemented by those skilled in the art.

However, it is to be noted that the present disclosure is not limited to the illustrative embodiments and examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

The term "about or approximately" or "substantially" used in the present specification is intended to have meanings close to numerical values or ranges specified with an allowable error and intended to prevent accurate or absolute numerical values disclosed for understanding of the present disclosure from being illegally or unfairly used by any unconscionable third party. Further, through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

The term "agent for reducing graphene oxide" used in the present specification is defined as referring to a material used for reducing graphene oxide. In the present disclosure, a material used for reducing graphene oxide may be a reducing agent containing a halogen element and also be a solvent that supports the reducing agent. The material may be a composition of one or more chemical compounds and/or molecules.

Through the whole document, the term "halogen" means chlorine, bromine, fluorine or iodine selected for an independent component.

Hereinafter the present disclosure will be explained in detail.

The present disclosure provides an agent for reducing graphene oxide, including a mixture of a reducing agent containing a halogen element with $CF_3COOH$ (trifluoroacetic acid). The reducing agent containing a halogen element may be selected from the group consisting of HI, HCl and HBr, and the reducing agent containing a halogen element may be, desirably, HI. Since the agent for reducing graphene oxide of the present disclosure further includes $CF_3COOH$, a quality of reduced graphene oxide can be remarkably increased and a preparing process temperature can be reduced to a temperature below 0° C., for example, to about −10° C., and down to about −20° C. For example, the preparing process temperature may be between 5° C. to −20° C., 0° C. to −20° C., or −10° C. to −20° C.

With respect to the underlying mechanism, $CF_3COOH$ is an acid weaker than the reducing agent containing a halogen element. Thus, it may play at least two roles during the reduction of graphene oxide. Firstly, when $CF_3COOH$ is added in HI as a strong acid, the $CF_3COOH$ helps HI to be easily dissociated into $I^-$ ions. Secondly, as compared with a case where HI is used alone, if $CF_3COOH$ is added to HI, it is possible to prevent over-reduction to a saturated hydrocarbon ($sp^3$) which may occur when the HI is used. Therefore, if $CF_3COOH$ is further included in comparison with the reducing agent containing a halogen element, a production yield of the reduced graphene oxide can be increased. Further, in accordance with the present disclosure, since $CF_3COOH$ is used instead of an acetic acid weaker than the reducing agent containing a halogen element, production of the reduced graphene oxide can be improved in view of a process temperature and a quality. This is because $CF_3COOH$ has a lower freezing point and a higher acidic strength as compared with the acetic acid.

Further, the present disclosure provides a method of preparing reduced graphene oxide, including reacting graphene oxide with an agent for reducing graphene oxide, wherein the agent for reducing graphene oxide includes a mixture of a reducing agent containing a halogen element with $CF_3COOH$.

In accordance with the present disclosure, the reaction between the graphene oxide and the agent for reducing graphene oxide is performed not only in a typical reduction temperature range but also at a temperature below 0° C., for example, at a temperature of about −10° C. or less, and desirably in the range of temperature from about −20° C. to about 120° C. A reduction reaction of graphene oxide can be performed effectively at a high temperature, which is obvious to those skilled in the art. Thus, in the present disclosure, the upper limit of the reaction temperature is not important but the lower limit of the reaction temperature is technically significant. In accordance with the present disclosure, the process can be performed a temperature below 0° C. at a temperature of about −10° C. down to about −20° C., and, thus, a high-quality reduced graphene oxide can be mass produced at a very low temperature.

In accordance with the present disclosure, the reducing agent containing a halogen element includes what is selected from the group consisting of HI, HCl and HBr, and desirably, the reducing agent containing a halogen element may include HI.

The graphene oxide used in the present disclosure may be in a form of powder, paper or film. By way of example, if the agent for reducing graphene oxide reacts with the graphene oxide paper, reduced graphene oxide in the form of paper can be obtained, and if the agent for reducing graphene oxide reacts with the graphene oxide film, reduced graphene oxide in the form of film can be obtained. The graphene oxide powder, paper or film can be prepared by a method publicly known in the art. In the present specification, details thereof will be omitted.

In accordance with an illustrative example of the present disclosure, reduced graphene oxide can be obtained by adding the graphene oxide into $CF_3COOH$ and then adding the reducing agent containing a halogen element thereto to be reacted therebetween. After the reducing agent is added, the mixture is stirred at a reaction temperature of about −10° C. for about 24 hours to about 72 hours, and, thus, reduced graphene oxide can be mass-produced.

In accordance with another illustrative example of the present disclosure, the method of preparing reduced graphene oxide further includes performing an ultrasonic treatment to improve dispersion of the graphene oxide before the reducing agent containing a halogen element is added. Such ultrasonication treatment can be performed by using an ultrasonication device, for example, for from about 1 hour to about 2 hours until the solution becomes transparent.

In accordance with still another illustrative example of the present disclosure, reduced graphene oxide paper or film can be prepared by immersing the graphene oxide paper or film in the mixture of the reducing agent containing a halogen element with $CF_3COOH$. After the graphene oxide paper or film is immersed in the mixture of the reducing agent containing a halogen element with $CF_3COOH$, if it is reacted in the above-defined reaction temperature range and washed and dried, reduced graphene oxide paper or film can be obtained.

In accordance with still another illustrative example of the present disclosure, reduced graphene oxide paper or film can be prepared by reacting between the graphene oxide paper or film with vapor gas which is evaporated from the mixture of the reducing agent containing a halogen element with $CF_3COOH$. For example, the graphene oxide paper or film may be positioned at an upper portion of a reactor in which the mixture of the reducing agent containing a halogen element with $CF_3COOH$ exists at a lower end and the reactor is sealed and positioned in an oil bath of which a temperature is maintained constantly. If a reaction temperature is maintained constantly, the reducing agent containing a halogen element is evaporated from the mixture of the reducing agent containing a halogen element with $CF_3COOH$ and become vapor gas. If the vapor gas of the reducing agent containing a halogen element is reacted with the graphene oxide paper or film, reduced graphene oxide paper or film can be thus prepared.

The reduced graphene oxide powder prepared in accordance with the present disclosure has excellent electric conductivity in the range of, for example, from about 100 s/m to about 60,000 s/m.

The reduced graphene oxide prepared in accordance with the present disclosure can be used in doping material for a plastic solar cell and an electrode material for super capacitor and lithium battery. The reduced graphene oxide paper prepared in accordance with the present disclosure can be used for a membrane filter and gas storage. The reduced graphene oxide film prepared in accordance with the present disclosure can be applied to various fields such as a biosensor, a transparent electrode material, a hole and electron transport layer of an organic electro-luminescence device, a flexible electrode material, a memory device, a third non-linear optical device, and a counter electrode plate material.

Hereinafter, the present disclosure will be explained in detail with reference to Examples. However, the scope of the present disclosure is not limited to the following Examples.

Example

There was used graphene oxide prepared from natural graphite powder (Bay Carbon, SP-1 graphite) by a modified Hummers and Offeman method using a $H_2SO_4$, $NaNO_3$, and $KMnO_4$. A portion of 240 mg of the graphene oxide was dispersed in 90 mL of a trifluoroacetic acid so as to obtain a dispersion solution. The dispersion solution was ultrasonicated for about 1 hour by using a Branson 1510 ultrasonic bath cleaner until the dispersion solution became transparent. Then, 48 mL of a HI solution (57 weight % in water) was added and stirred at −10° C. for 72 hours. As-obtained product was isolated by filtering and washed with saturated sodium hydrogen carbonate, distilled water and acetone, and vacuum-dried at room temperature overnight so as to obtain 145 mg of reduced graphene oxide.

Comparative Example 1

4 g of graphene oxide was added to 0.8 L of a hydroiodic acid (HI) and stirred at −10° C. for 48 hours. Then, a mixture was filtered through a filter paper and washed with a sodium bicarbonate solution, water, and acetone. Then, it was vacuum-dried at room temperature overnight so as to obtain 2.7 g of reduced graphene oxide.

Comparative Example 2

A reaction was carried out in the same manner as in Example except that acetic acid was used. However, acetic acid was frozen at −10° C. and a reaction did not proceed, and, thus, reduced graphene oxide could not be obtained.

Comparative Example 3-1

Reduced graphene oxide was prepared by using hydrazine hydrate by a method which has been known as a method for obtaining reduced graphene oxide with the highest purity so far [Reference Document: D. Li, M. B. M, S. Filje, R. B. Kaner, G. G. Wallace, Processable aqueous dispersions of graphene nanosheets. Nature Nanotechnology, 3 (2008) 101-105]. First, graphene oxide aqueous solution of 0.05 weight % was prepared. Then, 500 mL of distilled water, 1 mL of hydrazine hydrate of 35 weight %, and 5 mL of an ammonia solution of 28 weight % were added to 500 mL of this solution and stirred at 100° C. for 24 hours. After the reaction solution was cooled at normal temperature, the mixture was filtered through an anodisc membrane filter (diameter: 47 mm, pore size: 0.2 μm) and washed with distilled water ten or more times so as to obtain reduced graphene oxide with a production yield of 60%.

Comparative Example 3-2

A reaction was carried out in the same manner as in Comparative Example 3-1 except that the reaction was carried out at −20° C. However, hydrazine hydrate hardly reacted at a low temperature, and, thus, a satisfactory reduced graphene oxide could not be obtained.

Experimental Example 1

Elementary Analysis of Reduced Graphene Oxides Prepared in Example and Comparative Examples 1 and 3-1

In order to perform an elementary analysis of reduced graphene oxides prepared as in Example and Comparative Examples 1 and 3-1, respective samples burnt at a high temperature so as to obtain combustion products thereof. Then, contents of carbon, hydrogen, nitrogen, sulfur, and oxygen in the combustion products were analyzed. This method has been widely used as an important method for determining a purity of reduced graphene oxide and particularly, a composition ratio of carbon and oxygen.

After graphene oxide and the reduced graphene oxides prepared in Example and Comparative Examples were dried in a vacuum oven at 80° C. for 24 hours, 10 mg of a sample was extracted and elementary analyzed. The analysis result is listed in Table 1.

TABLE 1

| Sample | C | O | H | N | C/O |
|---|---|---|---|---|---|
| Graphene oxide | 44.56 | 46.43 | 2.13 | 0 | 1.28 |
| RGO prepared in Example | 82.3 | 8.32 | 0.5 | 0 | 13.19 |
| RGO prepared in Comparative Example 1 | 80.2 | 13.4 | 0.4 | 0 | 7.98 |
| RGO prepared in Comparative Example 3-1 | 85.32 | 11.42 | 0.11 | 3.15 | 9.96 |

According to the elemental analysis result shown in Table 1, an atomic percent ratio of carbon/oxygen in the graphene oxide was 1.28, an atomic percent ratio of carbon/oxygen in the reduced graphene oxide prepared in Example was 13.19, an atomic percent ratio of carbon/oxygen in the reduced graphene oxide prepared in Comparative Example 1 was 7.98, and atomic percent ratio of carbon/oxygen in the reduced graphene oxide prepared in Comparative Example 3-1 was 9.96.

The reduced graphene oxide prepared in Example of the present disclosure, i.e. obtained by using a trifluoroacetic acid as a reducing agent, had a higher atomic percent ratio of carbon/oxygen than that of the reduced graphene oxide prepared in Comparative Examples and did not contain a nitrogen atom operating as an impurity in case of using hydrazine. Thus, a high-purity reduced graphene oxide could be prepared.

Experimental Example 2

Measurement of Electric Conductivity

As a result of measurement of electric conductivity at normal temperature by using a MCT-T600 (Mitsubishi Chemical), electric conductivity of the reduced graphene oxide prepared in Example was about 40,500 s/m, electric conductivity of the reduced graphene oxide prepared in Comparative Example 1 was about 6,000 s/m, and electric conductivity of the reduced graphene oxide prepared in Comparative Example 3-1 was about 7,500 s/m, which can be seen from Table 2.

TABLE 2

|  | Graphite | Reduced graphene oxide prepared in Example | Reduced graphene oxide prepared in Comparative Example 1 | Reduced graphene oxide prepared in Comparative Example 3-1 |
| --- | --- | --- | --- | --- |
| Electric conductivity (s/m) | 80,400 | 40,500 | 6,000 | 7,500 |

The electric conductivity of the reduced graphene oxide prepared in Example was about 6 times higher than the electric conductivities of the reduced graphene oxides prepared in Comparative Examples 1 and 3-1. This proves that the electric conductivity of the reduced graphene oxide prepared in accordance with the present disclosure is excellent.

Experimental Example 3

X-ray Diffraction Pattern Analysis

Crystals of graphene oxide, the reduced graphene oxide prepared in Example, the reduced graphene oxide prepared in Comparative Example 1, and graphite (Bay Carbon, SP-1 graphite) were analyzed by using an X-ray diffractometer (SIGMA PROBE, ThermoVG, U.K.). X-ray diffraction patterns of each material were shown in FIG. 1. In FIG. 1, (a) is the graphene oxide, (b) is the reduced graphene oxide prepared in Example, (c) is the reduced graphene oxide prepared in Comparative Example 1, and (d) is the graphite. It can be seen that the reduced graphene oxide prepared in accordance with the present disclosure has a narrower pattern at 24.15°, which means that a gap between graphenes is more uniform.

Experimental Example 4

Raman Spectrum and X-ray Photoelectron Analysis

Figure 2A:
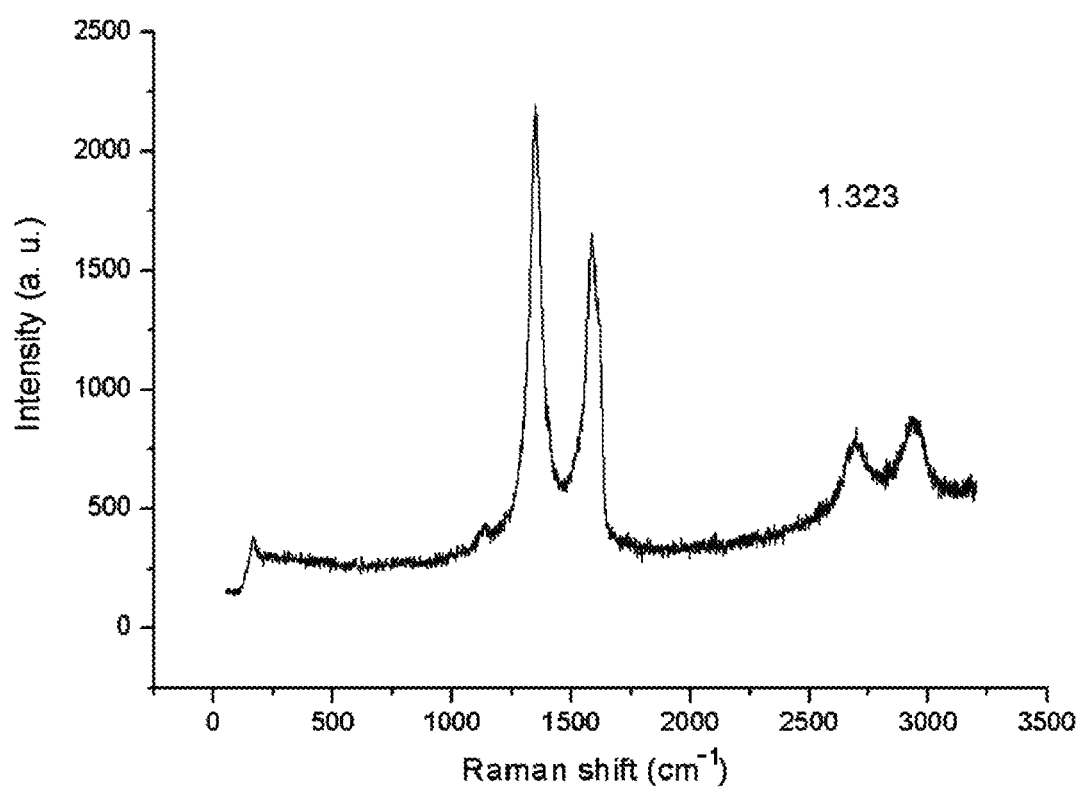
FIG. 2A is a graph showing a Raman spectrum analysis result of reduced graphene oxide prepared in Example.
Figure 2B:
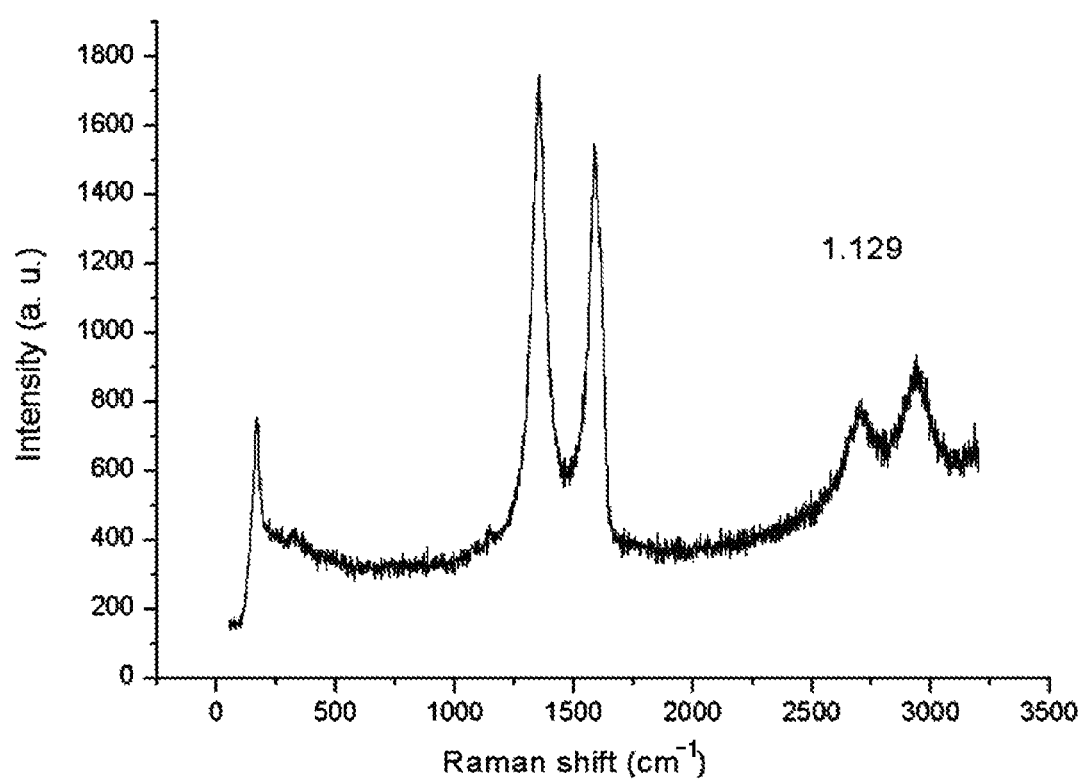
FIG. 2B is a graph showing a Raman spectrum analysis result of reduced graphene oxide prepared in Comparative Example 1.
Figure 3A:
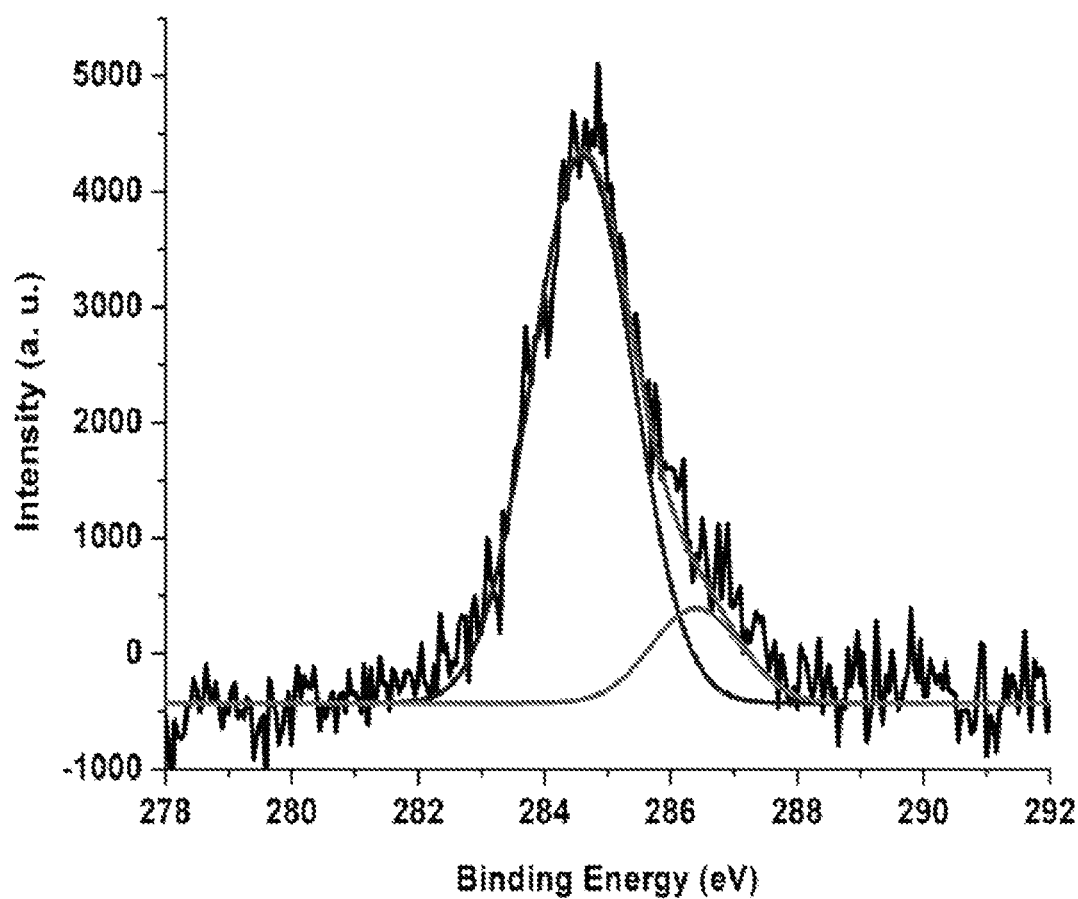
FIG. 3A provides X-ray photoelectron analysis data of reduced graphene oxide prepared in Example.
Figure 3B:
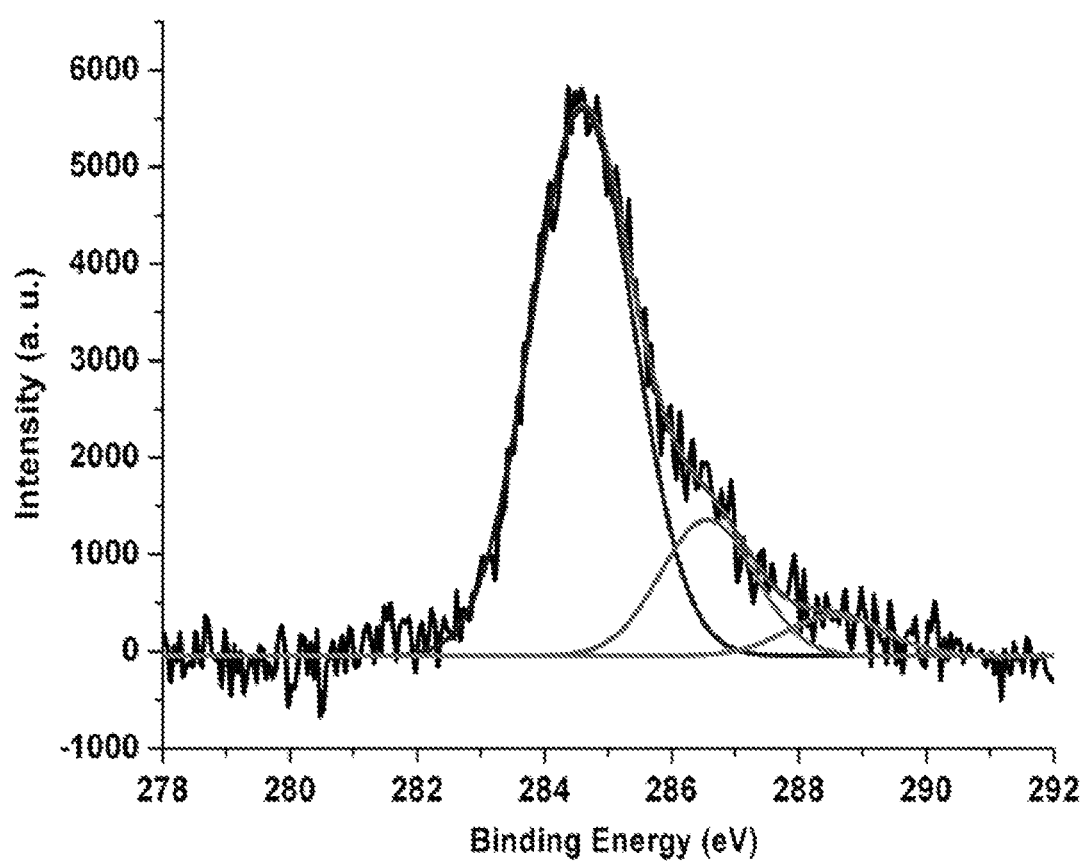
FIG. 3B provides X-ray photoelectron analysis data of reduced graphene oxide prepared in Comparative Example 1.

A Raman spectrum of the reduced graphene oxides prepared in Example and Comparative Example 1 was measured by using a Raman monochromator and shown in FIGS. 2A and 2B. XPS data of the reduced graphene oxides prepared in Example and Comparative Example 1 was measured by using an X-ray photoelectron spectrometer and shown in FIGS. 3A and 3B. From FIGS. 2A and 2B, typical D peak and G peak showing that graphene oxide is reduced to reduced graphene oxide can be seen and a D/G ratio is 1.323 and 1.129, respectively (a high D/G ratio means that graphene oxide is reduced well to reduced graphene oxide). Further, it can be seen from FIGS. 3A and 3B that the reduced graphene oxide prepared in Example contains less oxygen. That is, according from the results shown in FIGS. 2A and 2B and 3A and 3B, it can be seen that in the same experimental conditions, the reduced graphene oxide prepared in Example was reduced well as compared with the reduced graphene oxide prepared in Comparative Example 1.

Experimental Example 5

Thermogravimetric Analysis

Figure 4A:
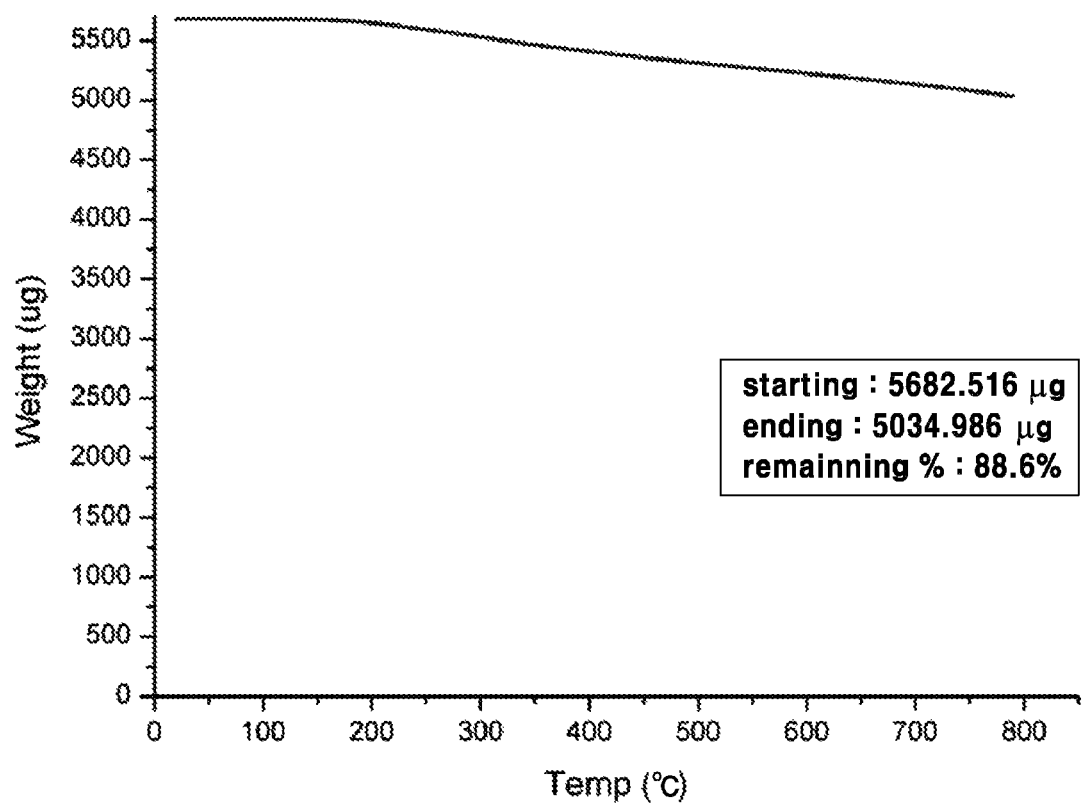
FIG. 4A is a graph showing a thermogravimetric analysis result of reduced graphene oxide prepared in Example.
Figure 4B:
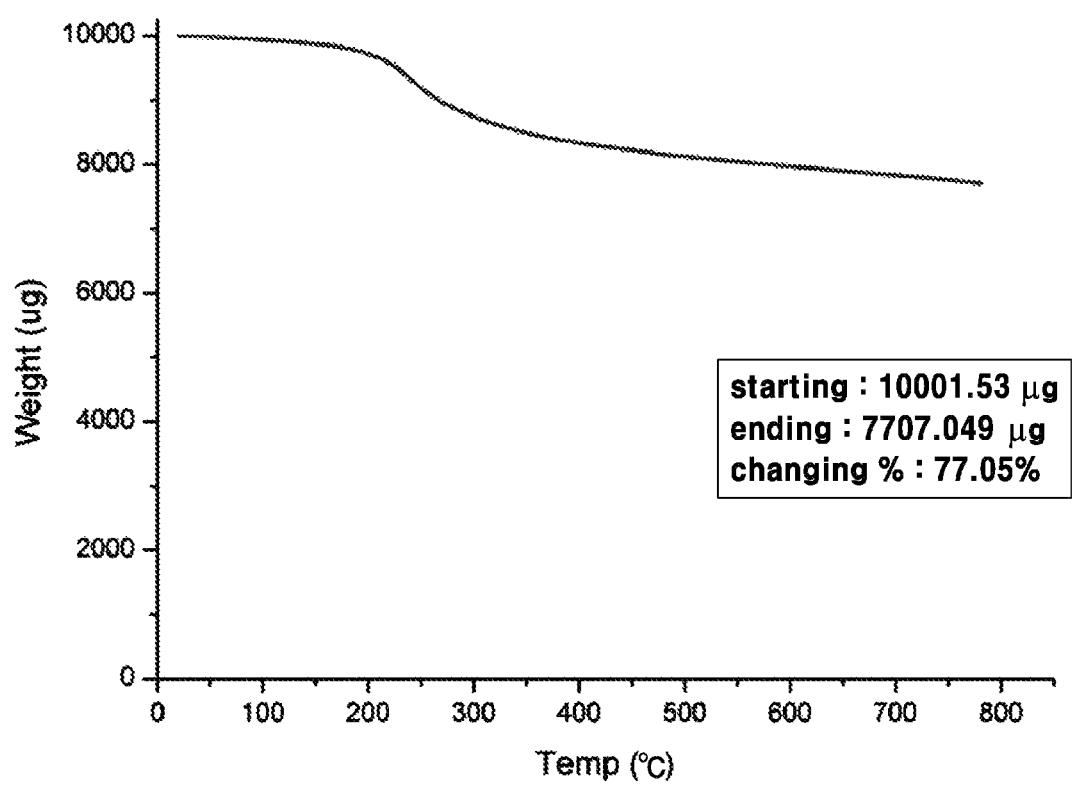
FIG. 4B is a graph showing a thermogravimetric analysis result of reduced graphene oxide prepared in Comparative Example 1.

A thermogravimetric analysis on the reduced graphene oxides prepared in Example and Comparative Example 1 was carried out by using a thermogravimetric analyzer, and graphs thereof are shown in FIGS. 4A and 4B, respectively. As can be seen from FIGS. 4A and 4B, in the reduced graphene oxide prepared in accordance with the present disclosure, a weight was scarcely decreased to about 200° C. and was just lost by about 10% or less to about 800° C. In Comparative Example, a weight was decreased at about 200° C. This proves that the reduced graphene oxide prepared in Example of the present disclosure was well reduced as compared with the reduced graphene oxide prepared in Comparative Example 1, and thus the reduced graphene oxide prepared in Example of the present disclosure corresponds to a reduced graphene oxide having higher quality and higher thermal stability.

The above description of the present disclosure is provided for the purpose of illustration, and it would be understood by those skilled in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

A number of examples have been described above. Nevertheless, it will be understood that various modifications may be made. For example, suitable results may be achieved if the described techniques are performed in a different order and/or if components in a described reaction, method or composition are combined in a different manner and/or replaced or supplemented by other components or their equivalents. Accordingly, other implementations are within the scope of the following claims.

What is claimed is:

1. A method of preparing reduced graphene oxide, comprising:
reacting graphene oxide with an agent for reducing graphene oxide,
wherein the agent for reducing graphene oxide includes a mixture of a reducing agent containing a halogen element with trifluoroacetic acid ($CF_3COOH$).

2. The method of preparing reduced graphene oxide of claim 1, wherein the reacting is performed at a temperature of −20° C. or higher.

3. The method of preparing reduced graphene oxide of claim 2, wherein the reacting is performed at a temperature of −10° C.

4. The method of preparing reduced graphene oxide of claim 2, wherein the reacting is performed in a temperature range of −20° C. or higher to 120° C. or lower.

5. The method of preparing reduced graphene oxide of claim 1, wherein the reducing agent containing a halogen element comprises one selected from the group consisting of HI, HCl and HBr.

6. The method of preparing reduced graphene oxide of claim 5, wherein the reducing agent containing a halogen element comprises HI.

7. The method of preparing reduced graphene oxide of claim 1, wherein the graphene oxide is in a form of powder, paper or film.

8. The method of preparing reduced graphene oxide of claim 1, wherein the graphene oxide is added to a solvent comprising the trifluoroacetic acid, and then the reducing agent containing a halogen element is added to the solvent to react the graphene oxide.

9. The method of preparing reduced graphene oxide of claim 8, further comprising:
performing an ultrasonic treatment before the reducing agent containing a halogen element is added.

10. The method of preparing reduced graphene oxide of claim 8, wherein the reducing agent containing a halogen element comprises HI.

11. The method of preparing reduced graphene oxide of claim 7, wherein the graphene oxide in the form of paper or film is immersed in the mixture of the reducing agent containing a halogen element with $CF_3COOH$.

12. The method of preparing reduced graphene oxide of claim 7, wherein the graphene oxide in the form of paper or film is reacted with vapor gas which is evaporated from the mixture of the reducing agent containing a halogen element with $CF_3COOH$.

13. A method of producing graphene, the method comprising:
reducing graphene oxide in a presence of a reducing agent including a halogen element and a solvent, the solvent including an acidic compound that is a weaker acid than the reducing agent.

14. The method of claim 13, wherein the acidic compound is trifluoroacetic acid ($CF_3COOH$).

15. The method of claim 13, further comprising:
dispersing the graphene oxide in the solvent before reducing the graphene oxide in the presence of the reducing agent.

16. The method of claim 13, wherein the reducing agent is one selected from the group consisting of HI, HCl and HBr.

\* \* \* \* \*